M. F. AND L. D. HILL.
MOTION PICTURE CAMERA.
APPLICATION FILED JUNE 5, 1913. RENEWED DEC. 29, 1921.

1,407,535.

Patented Feb. 21, 1922.

WITNESSES
Tomisaburo Yamamoto
H E Burton

INVENTORS
Myron F. Hill
Lewis D. Hill
By Hill & Simms ATTYS

UNITED STATES PATENT OFFICE.

MYRON F. HILL, OF NEW ROCHELLE, AND LEWIS D. HILL, OF MOUNT VERNON, NEW YORK, ASSIGNORS OF TWO-THIRDS TO EDMOND H. LYSLE, OF NEW YORK, N. Y.

MOTION-PICTURE CAMERA.

1,407,535. Specification of Letters Patent. Patented Feb. 21, 1922.

Application filed June 5, 1913, Serial No. 771,875. Renewed December 29, 1921. Serial No. 525,744.

*To all whom it may concern:*

Be it known that we, MYRON F. HILL and LEWIS D. HILL, citizens of the United States, and residents of New Rochelle and Mount Vernon, respectively, in the county of Westchester and State of New York, have invented certain new and useful Motion-Picture Cameras, of which the following is a specification.

Our invention relates to the art of photographing continuous motion pictures, and has for its object the taking of pictures of the complete motion of the moving objects being photographed.

Heretofore it has been the custom to photograph moving objects during portions of the time during which their movements take place. For example, when sixteen pictures are being taken per second, the exposure of the sensitized surface is generally for one-thirty-second of a second, and consequently between that exposure and the next exposure there is one-thirty-second of a second during which there is no exposure whatever of the film. When such pictures are projected upon a screen, they are exhibited in a succession of isolated positions. A horse's foot, for example, may be caught by the camera man first at one end of a running step and then in the middle of a running step, or even at the end of it. Or again, the pictures may be taken from the middle positions during the successive steps, and every end of the steps may not be caught by the camera. When these pictures are thrown upon the screen, the effect produced is insufficient to give the full idea of motion.

In photographing plays, it is well known that actors are warned not to make any sudden movements intended for expression, since they are most likely to be lost upon the film. Hence, in order to produce the effect upon the eye produced by the motions of the objects in true life, a system of taking moving pictures is essential which photographs all of the movements of an object from beginning to end. Under the method of photographing heretofore practiced, wheels in motion are shown in a series of successive positions unrelated to each other, and when projected upon the screen, the series of positions being flashed to the eye give the effect perhaps of progression, but fail to give the idea of rapid rotation. Such a wheel in life appears to the eye as a blur (presuming that the motion is sufficiently rapid and steady) and in order to give the full effect of motion pictures, the motion of the wheels upon the screen must also be shown blurred.

Our method consists in focusing upon a steadily moving film and within a fixed area upon the film the photographic rays emanating from moving objects.

It consists further in causing the picture of the moving object during a definite period of time to sweep on to and off from the area on the film in such a way that there is an even exposure of all parts of the film to the light rays from the moving object.

It consists further in causing the same picture to sweep in succession across two successive areas on the film.

It is an incident of this method that during photography a portion of this picture may be in the process of being photographed upon a portion of one area upon the film and the rest of the moving picture being photographed at the same instant upon the complemental portion upon another area upon the moving film.

Pictures may be taken in accordance with our method at the rate of sixteen per second, if desired, which will allow sufficiently for the persistence of vision so that a steadily moving picture upon the screen is presented to the eye.

Pictures may, however, be taken with greater frequency, and as many as forty-eight pictures per second have been contemplated. Such a frequency of pictures would give perhaps a smoother effect to the eye, and is of particular use, as heretofore described, when projecting pictures which vary in their color, for the purpose of producing natural color effects.

In ordinary photography, films are jerked along intermittently with the result that the mechanism is caused to vibrate, and the pictures are rendered correspondingly indistinct upon the film.

By means of our method of continuous photography in which the film and the mechanism carrying the same move steadily, the machine makes no such vibration, and the pictures are more definite and distinct than in machines otherwise constructed.

Another curious result has been discovered; namely, that when pictures are photographed through prismatic blocks of transparent material, or probably slightly translucent material, the pictures become clearer and more definite, due perhaps to the fact that the prisms disperse a large proportion of the lighter and more invisible photographic rays.

The optical devices which we prefer to employ in our method consist in the aforesaid prismatic blocks of glass. Three such reflectors at least are preferably employed to deflect the photographic rays from the scene photographed to focal points bearing a fixed relation to the continuously moving film.

One reflector may at one instant transmit the beam of light from the entire picture photographed to the whole area upon the film, but the next instant it is transmitting only a portion of the picture to a portion of that area. At that particular instant there should be in place a second reflector to receive the rays from the complemental portion of the picture photographed to the succeeding area upon the film. The second reflector continues to advance at a speed proportionate to that of the film until finally it reflects the entire picture to the second area upon the film which thus progressively takes the place of the first area in receiving photographic rays. At the particular instant when the second reflector is transmitting the whole of a picture upon the second area, the first reflector has gone out of action. At the same instant there should be a reflector ready to transmit rays from the moving objects to the first portion of the third area and so on. For convenience, a number of reflectors are employed.

If an even number of reflectors is employed, kinemacolor effects may be produced upon the film, provided that the prisms are alternately colored in accordance with the kinemacolor scheme. One prism may transmit bluish-green rays to one area upon the film, and the next prism may transmit orange-red rays to the next area upon the film, and so the successive areas may alternately receive these alternate color effects and record them.

If three colors are employed, a third prism may be colored as a filter for any other color—preferably yellow. In case three color effects are employed, the number of prisms should be a multiple of three.

In case two color effects are employed, the machine is preferably so speeded as to produce about thirty-two pictures per second. In case three color effects are employed, about forty-eight pictures per second are taken for best results.

In order to accomplish our method, we have shown and described a particular mechanism which may be one of many that may be capable of producing the desired results.

In this mechanism.

Figures 1, 2, 3:
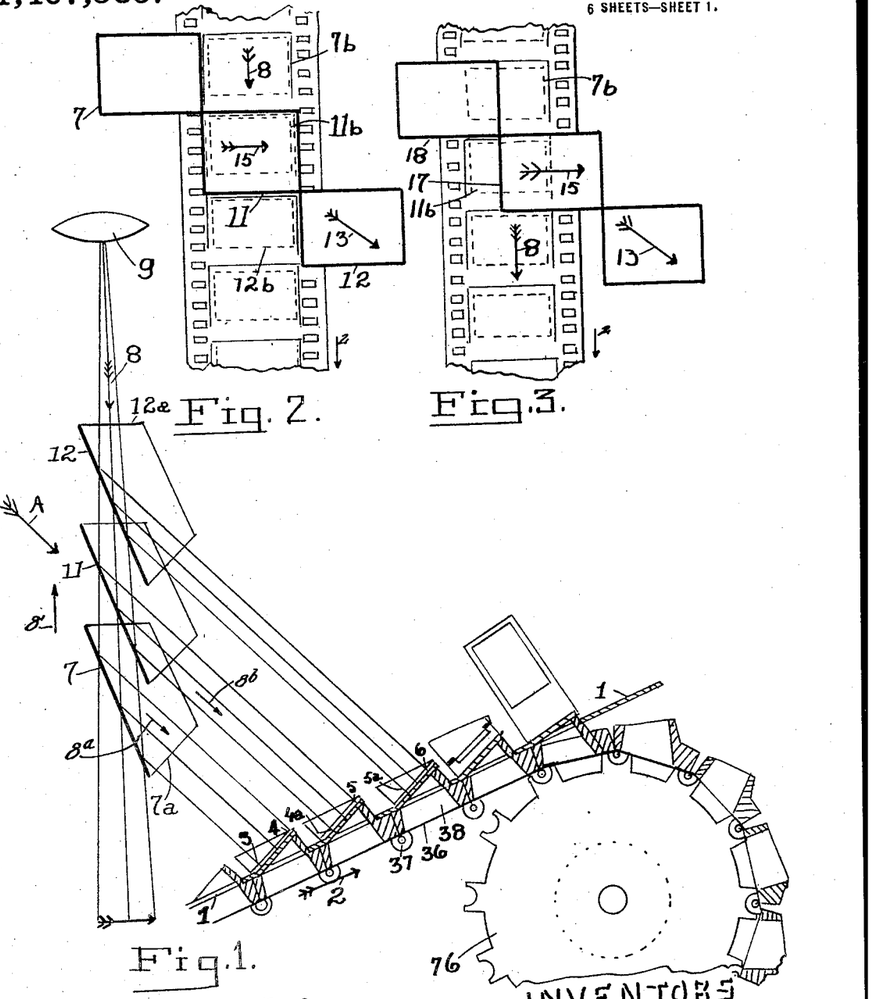
Fig. 1 shows a diagram view of the paths of the prisms and film pictures.
Fig. 2 is a view taken in the direction of the arrow A, Fig. 1, of the registration of the prisms, or at least the reflecting portions of the prisms with the pictures upon a film.
Fig. 3 is a similar view, taken after a short interval of time when both film and prisms have travelled a short distance in their respective directions.

In Fig. 1 is shown a film 1 adapted to travel in the direction of the arrow 2. There may be a picture area upon this film between the points 3 and 4, and between $4^a$ and 5, and between $5^a$ and 6, and so on.

The picture photographed upon the area 3—4 may be reflected by a prism in the position shown at 7. The rays enter the prism through the end $12^a$ in a substantially perpendicular direction. The rays then are reflected from the back of the prism 7 in the direction of the arrow $8^a$ to the area 3—4. Likewise, when the picture is photographed upon the area in the position shown between the points $4^a$ and 5, the prism has advanced to the position shown at 11, the rays of light from the picture entering the prism and being reflected in the direction of the arrow $8^b$ to the area $4^a$—5.

Likewise, when the picture is reaching the area in the position shown between the points 5ᵃ and 6, the prism has reached the position shown at 12, and if any rays of light enter and leave the prism, they are photographed upon the area in this position. Between these extreme positions, the areas may have an innumerable number of positions, all of which are preferably parallel with each other, and the prisms may have a corresponding infinite number of positions, the positons of their reflecting surfaces also being parallel with each other.

When the rays of light leave the prisms, they pass through the ends of the prisms in a direction substantially perpendicular to the plane of the end surface of the prism, as shown, for example, at 7ᵃ.

In other words, as the areas upon the film 1 travel in the direction of the arrow 2, the reflecting surfaces of the prisms travel in a direction corresponding to the direction of the film. The prisms actually travel in a direction which is the resultant of three elemental component directions of motion. One direction is parallel to the movement of the film as indicated by the arrows 8 of Figs. 2 and 3. Another direction is laterally across the first direction to permit the prisms to travel across the film, as indicated by the arrows 15 in Figs. 2 and 3. The third component direction of motion is divergent from the direction of the film, as shown by the arrow 8′ in Fig. 1. This motion is for the purpose of maintaining an equal focus during the various successive positions.

Figures 4, 6, 7, 8:
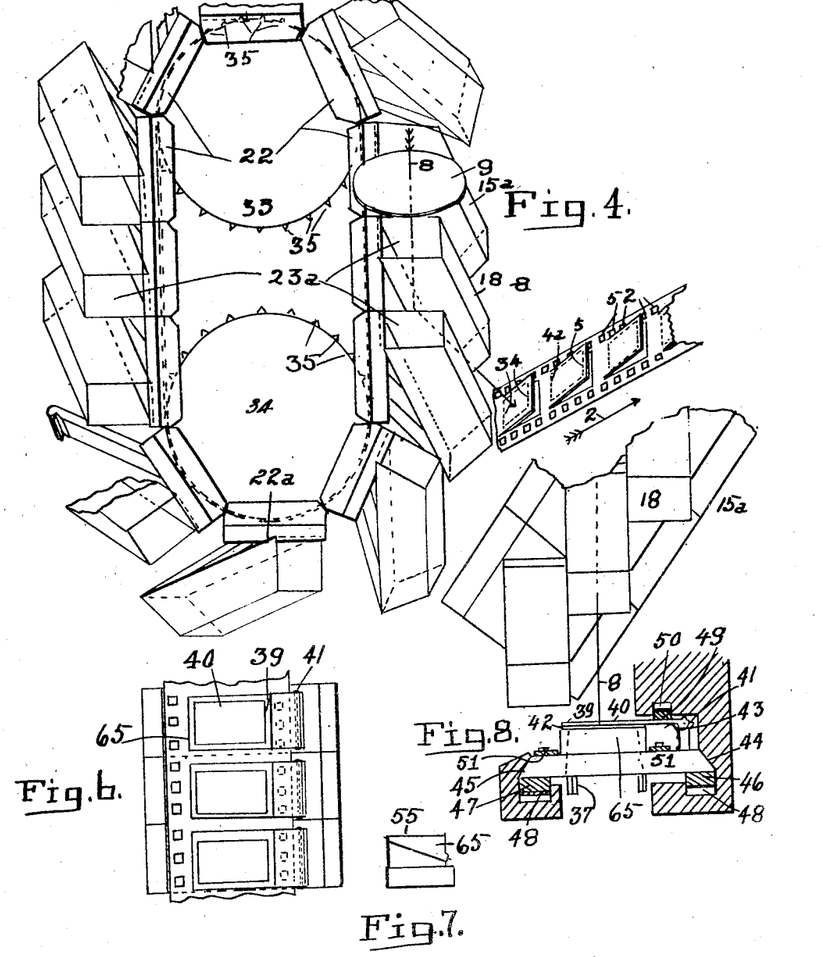
Fig. 4 is a side view of the prism-carrying devices.
Fig. 6 is a plan view of the film and the film-carrying devices.
Fig. 7 is a side view of a block or link of the chain which carries the film across the line of vision.
Fig. 8 shows an end view of a similar block with the guideways in section.
Figure 11:
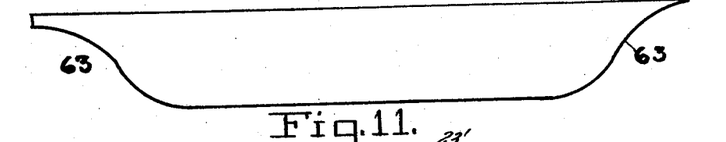
Fig. 11 is a top view of the guideway shown in Fig. 10.
Figure 12:
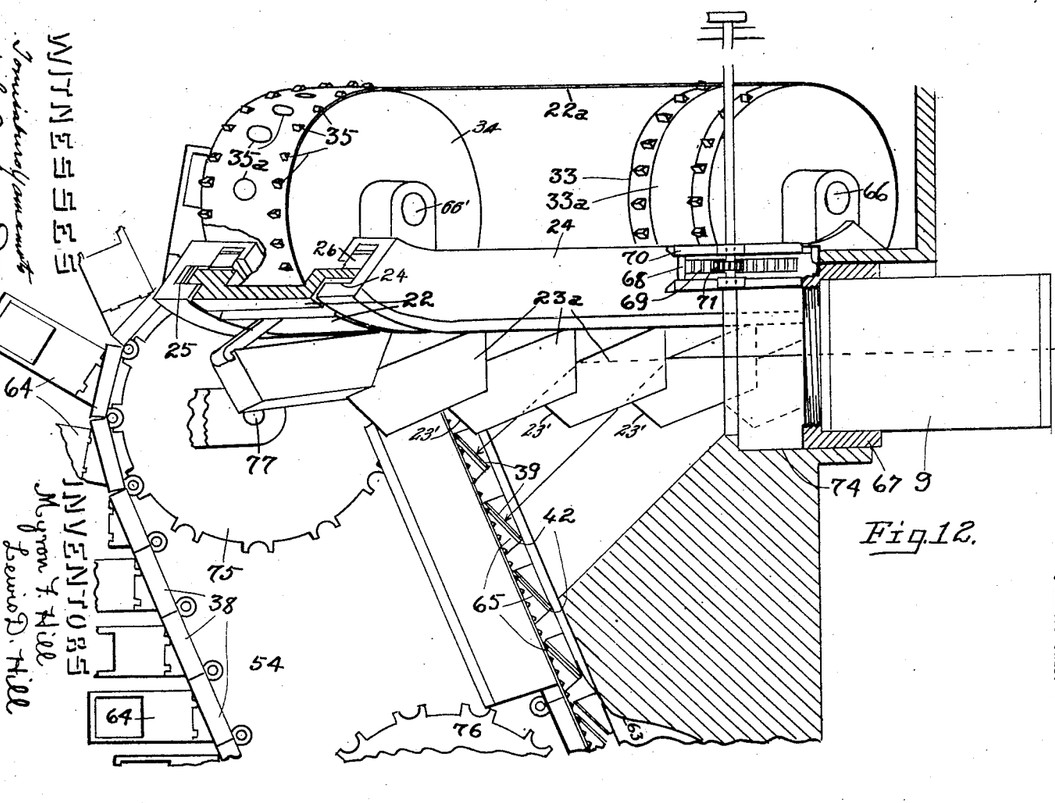
Fig. 12 is a vertical elevation of the film and prism carrying devices, and their assembly with relation to each other and to the objective.

Since a plurality of prisms is employed, those shown at Figs. 7, 11 and 12 may indicate the distances in the direction of the arrow 8 between them. These prisms are also shown in projection in Figs. 2 and 3, viewed in the direction of the arrow A, Fig. 1. In Fig. 2 the prism or reflector 7 is in a position where it will soon begin to reflect a portion of a picture to the area shown within the broken lines 7ᵇ. The reflector at 11 in Fig. 2 is in a position to reflect the whole picture to the area enclosed within the lines 11ᵇ and the reflector 12 has passed away from the area enclosed within the broken lines 12ᵇ. In this position, in other words, the reflector 11 is doing the entire work.

The film is travelling in the direction of the arrow 2, and the prismatic reflectors are travelling in a corresponding direction, which is that of the arrows 13 in Figs. 2 and 3, so that the adjacent edges of the reflectors always lie between the successive areas upon the film. No reflector in its action overlaps two areas at any moment. The reflectors are also travelling laterally across the film in the direction of the arrow 15, so that as the film advances, one reflector goes out of action as the other reflector comes into action.

In Fig. 3 these reflectors are shown in new positions. It will be noticed that the film has travelled downward, a distance equal to a portion of the lineal length of a picture. In this position the middle reflector shown has travelled to the position 17, in which position it reflects only that portion of the picture to the area 11ᵇ which lies beneath itself or adjacent thereto, whereas the complemental portion of the picture is photographed upon the area 7ᵇ on the film, this portion being substantially that which lies beneath the reflector in a position 18, and enclosed within the broken lines 7ᵇ. In this way a portion of one area is affected by rays reflected by one reflector, and a complemental portion of another picture is affected by rays reflected by another reflector.

This dividing line is not a sharp one, since rays of light from any point along the dividing line from the picture are reflected by both reflectors to the film areas, so that their edges are blended. The only rays that are lost are those which impinge upon the dividing line between the prisms.

Figure 5:
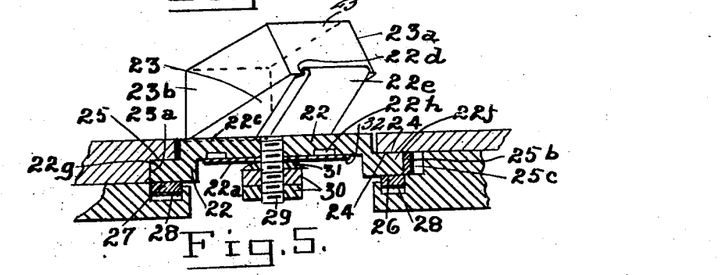
Fig. 5 is a sectional view of a block carrying a prism with the guideways in section.

It will be understood, of course, that the rays from any point of a picture converge upon the film, and all of the rays from any one point that are caught by the lens are concentrated to a corresponding point upon the film. Naturally, some of these rays might strike upon the sides of any prism being used as a reflector. Such a prism is shown in Fig. 5. This prism may be mounted upon a block 22, and have a reflecting surface 23. The end 23′ of the prism 23ᵃ is disposed parallel with the picture upon the film to direct the rays to the film in a perpendicular direction to the plane of the end of the prism. Since, however, some of these rays are radiating as stated from any point of the picture, and converging upon the film, they are apt to strike the sides of the prism either inside or outside. To eliminate any wrong reflection which would create confusion upon the film, the two sides of the prisms and their tops are ground so that they have a frosted effect, and then are preferably painted dead black. This suppresses any internal or external reflection from the sides of the prisms. The bottom and ends of the prisms are polished. Crown glass gives good results. Each prism is mounted by having its lower corners and edge resting in an acute angled groove in the block 22, as indicated at 22ᶜ, shown also in Fig. 4. Its rear end is held by a corresponding groove 22ᵈ in the support 22ᵉ which is fixed to the block 22 in a suitable position, or which may form an integral part of the block 22. The various blocks 22 carrying the various prisms 23ᵃ are carried across the line of light in a straight line located, as heretofore described. They are preferably held in guides shown in section in Fig. 5.

Each block is provided with lateral extensions 22$^f$ and 22$^g$, which are pressed upward against guiding surfaces 24 and 25 by means of strips 26 and 27 respectively, these strips being supported by leaf springs 28, so that at all times the blocks are held securely against the guiding surfaces 24 and 25.

The lateral extension 22$^g$ is also pressed sidewise against the guiding surface 25$^a$ by the strip 25$^b$, actuated by the spring 25$^c$, so that at all times the blocks are pressed laterally against one guiding surface. These guiding surfaces and pressure strips may be made of anti-friction material of any suitable kind.

The blocks are carried around by any suitable endless carrier. Each block may have a post 29 securely attached to it in its middle or in any other suitable portion by suitable nuts 30. A half-rounded washer 31 may be used between the nuts and the band 32 which may be endless and of thin spring steel, or it may be of any other suitable material. This band is carried around by sprockets 33 and 34, as shown in Fig. 4, the sprockets having teeth 35 engaging equispaced perforations in the band as shown at 35 in Fig. 12, and as indicated in broken lines in Fig. 4 at the top of the figure.

In Fig. 4 is shown the direction of travel of the film, the direction being shown by the arrow 2. In this view is shown also how a portion of the picture between the lines 3 and 4 is photographed through the prism in the position 18, corresponding with the position 18 in Fig. 3. It is also evident how a portion of the picture between the lines 4$^a$ and 5 may be photographed through the prism in the position 15. The lens 9 is located parallel to the end of the prism at 18, and the picture areas upon the film are tilted up so that they are parallel with the nearest end surface of the prism 18. Since all the prisms in their active positions are parallel with each other, this relative location of lenses and picture areas is the same with all the prisms when in the line of light.

In Fig. 4 the guideways shown in Fig. 5 are removed. There may be twelve prisms for convenience, or there may be a larger number of prisms as shown in Fig. 12, the approximate dimensions shown in Fig. 12 permitting fifteen or sixteen prisms.

In case colored pictures are to be photographed, the prisms may also be light filters. If two color photography is being effected, the number of prisms should be some multiple of two. If three color photography is effected, the number of prisms should be some multiple of three, the successive colors being orange-red, blue-green, and yellow. Forty-eight pictures per second will give good results in taking and in projecting.

While the steel band and the guideways seem to be the most accurate method of carriage, these prisms may be carried around in any suitable manner. The driving sprocket acts upon the band equally during each successive instant, and the blocks are held in correct position; the grooves 22$^h$ being provided to receive the ends of the sprocket teeth when they engage the perforations in the band. The holes 35$^a$ receive the various posts in the various prism blocks.

In Figs. 6, 7 and 8 are shown the means for holding the film picture areas in place and for carrying the film across the line of light. The chain in Fig. 1 comprising the links 36 may be used, each link being pivoted to the next one by means of the ears and pivots 37.

The portion of the picture area upon the film, which is receiving light rays, is enclosed within the framing device 39, shown in Fig. 6. This framing device consists of a hinged cover having an open space 40, and the hinged pivot 41. The various framing devices are similar in construction, as shown in side elevation in Fig. 8, where each framing device rests upon the uptilted portion of the film 42. Any suitable means may be provided to cause these framing devices to remain open when not co-operating with the film. A spring may perform this function, as shown at 43. The top of each framing device is preferably parallel to the bevelled guiding edges of the blocks, as shown at 55, in Fig. 7, this surface co-operating with the pressure strip 49 for the purposes heretofore described.

Each link may constitute a supporting block for the uptilted picture of the film, and may be guided in its motion across the line of light by suitable guideways 44 and 45. Each block is pressed against these guideways by friction strips 46 and 47, supported by the leaf-springs 48. The framing devices may be held firmly upon the uptilted portion of the film by means of the pressure strip 49, engaged by the leaf-spring 50 for this purpose. Various blocks may be provided with teeth 51 to engage the perforations 52, in the film shown in Fig. 4.

Figure 9:
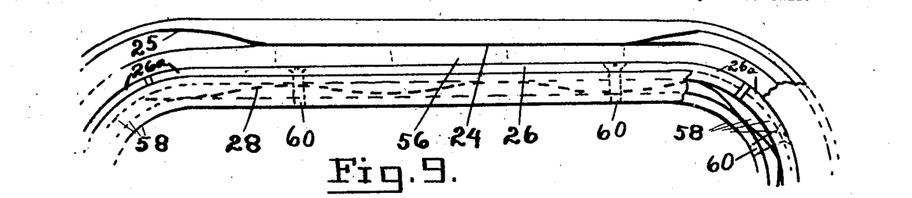
Fig. 9 is a side view of one of the guideways for the prism carrying blocks taken from between the two guideways.

In Fig. 9 is shown a view of one of the guideways adapted to guide the prism blocks while the prisms are travelling across the line of light. The guiding edges of the prisms travel in the guideway 56. The blocks are guided by the upper surface 24, and are held against this surface of the strip 26. The wavy leaf spring may extend from one end of this strip to the other, as shown in broken lines at 28. The upper guiding surface 24 is inclined, as shown at 25, to permit the rectangular guiding flanges of the blocks to take the turn properly. These guideways may be continued all the way round the endless carrier, as indicated by the broken lines 58, and to guide the blocks in all their successive positions, if desired, the strips 26 being in sections 26ª so that any noise of the blocks entering a guideway may be eliminated.

Figure 10:
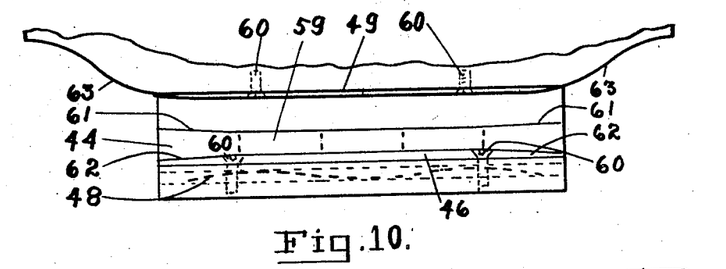
Fig. 10 is a corresponding view of the right-hand guideway shown in Fig. 8, adapted to guide the links of the film carrying chain.

In Fig. 10 is shown a guideway for the film carrying blocks, this being a side view of the right-hand guideway shown in Fig. 8. This guideway is provided with the slot or opening 59, the guiding surface 44 and the upper pressure strip 49. The lower pressure strip is shown at 46, and the leaf spring in heavy broken lines 48. The pressure strips above and below may be loosely secured by means of the screws 60, which limit the distance which the springs can push them in the direction of the blocks. The slot or opening 59 is suitably flared, as shown at 61 and 62, to render the entrance and exit of the blocks easy and quiet. The guideways, may, if desired, extend all the way around the endless carrier, and the pressure strips may likewise be extended all the way around in sections for the purpose of rendering the travelling action of the blocks silent.

An extension 63 is provided which is adapted to guide the framing covers 39 from their open position shown at 64 in Fig. 12 to their closed position, as shown at 65, in Figs. 6, 7, 8 and 12. These guiding surfaces 63 are also shown in Fig. 11, which is a plan view of the device shown in Fig. 10. These guiding surfaces render entrance to, and exit from the guideway for the blocks and framing devices easy and quiet. The guideways may be extended around the entire path of the chain, if desired.

In Fig. 12, the sprocket 33 is shown to be double and having a space between the two portions at 33ª. This is to make possible the passage of the post 29 and the nuts 30 of the various blocks, and the width of this opening should be greater than the width of the nuts. The sprocket 33 is mounted upon the shaft 66, the other end of which passes through the rear of the housing (see Figs. 12, 13 and 14) which is adapted to be light-tight and adapted to carry the various working parts. The sprocket 34 is mounted upon the shaft 66' parallel to the shaft 66. The objective 9 may be of the usual type, containing two lenses, and may be screwed into the holder 67 which is provided with an extension 68, carrying a rack 69, the extension being guided in the dovetailed groove 70. A pinion 71, engaging the rack is adapted to be operated by the handle 72 outside of the casing, the wall of which is represented at 73. By turning the handle 72, one may cause the rack to travel in its guideways, and as the rack and extension 68 are secured to the objective 9, the latter is caused to move. The holder 67 is journaled freely in the recess 74, in which it is adapted to be adjusted back and forth for the purpose of securing proper focus. The outside of the guideway 24 is here indicated in full lines; the opposite guideway 25 also being shown. The various blocks 22 are adapted to carry the various prisms 23ª across the line of light in the diagonal path illustrated. This diagonal path is indicated by the arrow 13 in Figs. 2 and 3 combined with the arrow 8 in Fig. 1, and its relation to the arrow 2.

The film may travel in the direction of the arrow 2, Fig. 1. When a prism has travelled a distance equal to the distance from any corner of one prism to the same corner of the next prism, each picture area on the film must have travelled for best results a distance equal to that between the top of one picture area and the top of the next picture area, in the direction of the film movement. The portion of the film which is in active position is carried by the series of blocks forming the endless carrier, as illustrated in Fig. 12. This carrier travels over two sprocket wheels, as shown at 75 and 76, the latter being shown only to a small degree, but which may be identical with sprocket 75. Each sprocket is mounted upon a shaft 77 in suitable bearings.

Figure 13:
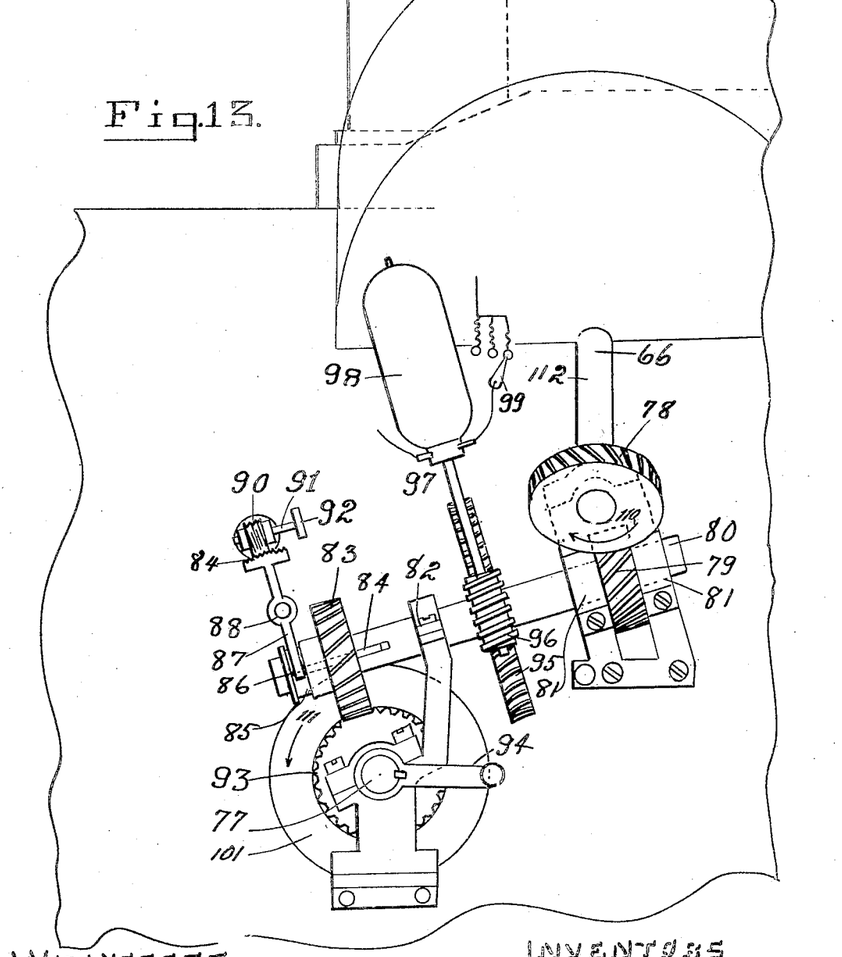
Fig. 13 is a view of the synchronizing mechanism therefor.

In Fig. 13 it is shown how the shaft 66 of the sprocket 33 is carried through the casing to the outside, and is provided with one member of a skew gear 78 which meshes with the other member 79 of the skew gear mounted upon the shaft 80. The gear 79 is fixed to the shaft 80, and may form a part thereof, and is snugly held between bearings 81. The shaft 80 may also be provided with an additional bearing 82 for aligning purposes, and is provided with a slidable gear 83, loosely journaled on the shaft, but adapted to slide along the key 85 adapted to receive a roller 86 pivoted upon a lever 87 fulcrumed at 88 and provided with a threaded rack 89 meshing with a screw-threaded device 90. The screw-threaded device 90 is fixed to the shaft 91, and provided with a handle 92, and is mounted in suitable bearings, so that in turning the shaft, the lever 87 may be shifted in its position and caused to shift the position of the gear wheel 83. Since this gear wheel meshes with the corresponding gear 93, the relative positions of the shafts 66 and 77 may be shifted. It will have been understood that the shaft 77 projects through the casing from within where it carries the sprocket 75, as shown in Fig. 12. Upon the shaft 77 may, if desired, be attached a handle 94 for the purpose of operating the machine. I prefer, however, to employ a worm gear 95 fixed to the shaft 80 and operated by the worm 96 upon the shaft 97 adapted to be rotated by the motor 98, the speed of which may be varied by the rheostat 99. The motor 98 may be driven by any suitable source of power, and may be reversed for rewinding the film.

The mechanism shown in Fig. 13 acts as a synchronizing mechanism, and is adapted to cause the reflectors and the picture areas upon the film to travel through corresponding distances in the same periods of time. For this reason, the size of the skew gear and worm wheels 78, 79, 83 and 93 must be so proportioned in their dimensions as to secure correlative distances of travel within any given period of time, as heretofore described.

Figure 14:
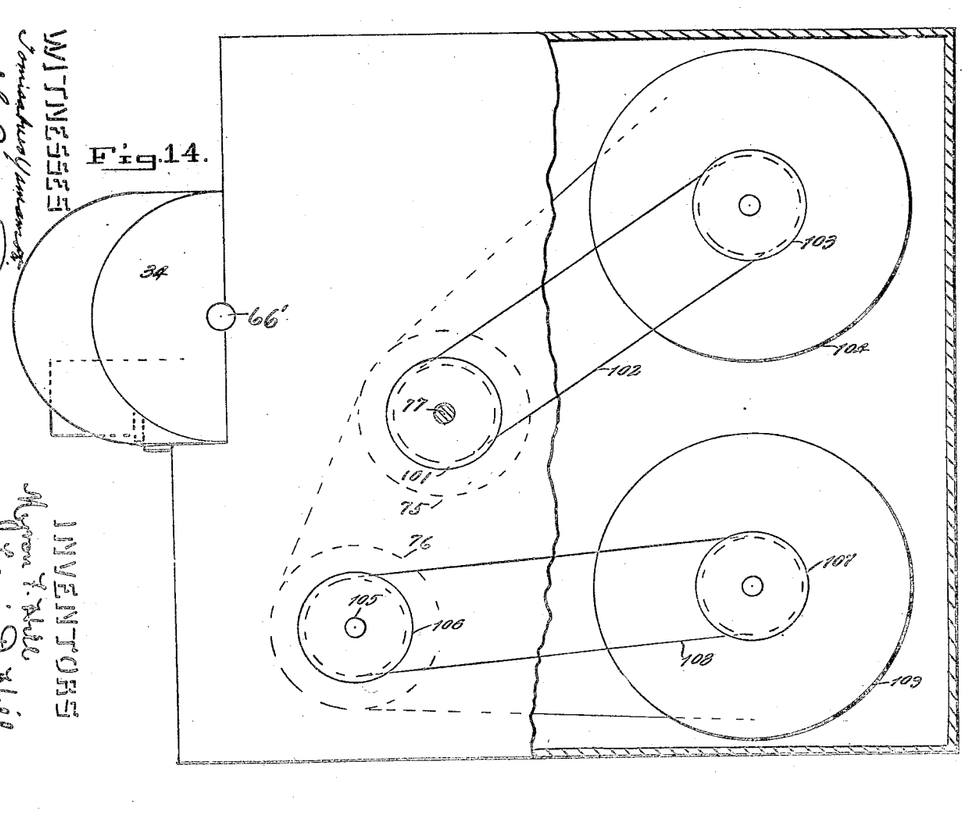
Fig. 14 is a view of one side with the synchronizing gears removed, and part of the casing in section.

In Fig. 14 is shown an outside elevation of our machine with the gearing shown in Fig. 13 removed, and part of the casing broken away to show the reels. The shaft 77 is provided with a pulley 101 shown also in Fig. 13, which is geared by a belt 102 to a pulley 103 upon a reel 104 mounted in suitable bearings. The sprocket indicated at 76 in Fig. 12 is provided with a shaft 105 shown in Fig. 14. Upon this shaft is fastened a pulley 106 which is belted to the pulley 107 by means of the belt 108 to operate the reel 109, so that it winds upon itself the film 1 after it has passed through the line of light. Belts 102 and 108 are loose so that they may easily slip upon their pulleys to compensate for the reducing number of rotations per minute of the reels 104 and 109 as the film winding progresses. The pulleys and belts shown are so gauged as to operate the reels at the fastest required speeds. The belt 102 is not used during photography but is slipped off from its pulleys. The belt 108 is employed for operating the reel 109 for winding purposes during photography. When the film is being rewound after photography upon the original reel 104, the belt 102 is replaced upon its pulleys and the belt 108 is slipped off from its pulleys, or from at least one of them.

The focal distance from the objective 9 to the film picture areas is effected by the prisms. The glass has the effect of bringing the virtual image nearer to the objective, and this has to be compensated for by increasing the actual focal length. The index of refraction for various transparent mediums varies, and must be taken into account when determining the limits of focal adjustment.

In operation, the reel 104 is first equipped with a length of film placed in the box shown in Fig. 14. The empty reel 109 is also located in the box, and the belt 108 slipped over the pulleys 106 and 107, and the end of the film on the reel 104 passed over the chain composed of the hollow blocks 38 and attached to the core of the reel 109 in the usual way. The motor 98 is then switched into circuit to be operated at the proper speed and in the right direction to cause the film to pass from reel 104 to 109. This movement is effected by causing the worm 96 to engage the gear 95 as shown in Fig. 13, so that the shaft 80 turns in the direction of the arrow 110. This causes the gear 83 to drive the gear 93 in the direction of the arrow 111. The gear 93 drives the sprocket 75 shown in Fig. 12, so that the film is caused to travel across the line of light reflected upon the picture areas from the prisms 23$^a$.

The picture areas are tilted up, as shown in Figs. 1 and 12 so that all parts of the areas have substantially constant focal distance from the objective 9. The uptilted portions of the film are clamped in place by the hinged framing devices 64, while passing through the line of light. These framing devices are open to allow the film to enter the chain arrangement and to leave it. The shaft 80 also drives the skew gear 79 which is in mesh with its mate 78 driving the shaft 66 in the direction of the arrow 112. This causes the sprocket 33, in Fig 12, to carry the band 22$^a$ in such a way that the blocks 22, carrying the prisms 23$^a$ pass across the line of light and reflect the beams of light to the uptilted picture areas upon the film. Each picture area is so arranged that the beam of light from the objective and prism falls perpendicularly upon it.

The shaft 105 in Fig. 14 is driven by the chain of hollow blocks 38. The shaft 105 also drives the pulley 106, the belt 108 and the pulley 107, thus causing the reel 109 to rotate upon its shaft. The reel 109 thus is caused to wind up the film as it unwinds from the reel 104, and when the reel is filling up, the belt 108 slips freely upon the pulley 107, thus arresting the speed of rotation of the reel 109. In this way a tension is kept upon the film 1 during photography.

After it is over, the belt 108 is slipped off from one or both pulleys and the belt 102 is slipped on to the two pulleys 101 and 103 so that as the shaft 77 is caused to travel in the opposite direction by reversing the motor 98, the reel 104 rewinds upon itself the film 1 which is correspondingly rewound from the reel 109.

While I have described an arrangement of prisms, and tilted film picture areas having equal focal distances from the objective in their two directions of travel, and the prisms are so arranged that one prism passes slowly out of action at the same time that the following prism passes slowly into action, it is quite possible that many other arrangements may be made by which the same result may be obtained. Such other arrangements are shown in other applications filed concurrently with or subsequent to the filing of this case. This case is intended to be the generic case with respect to the broad principles of continuous photography, and the other cases are intended to be specific.

This application is for a process or method of continuously recording the motions of a moving object through an open lens system irrespective of the particular apparatus employed for carrying out that process. In our copending application, Serial No. 771,037, filed May 31, 1913, is illustrated a particular form of apparatus which is particularly adapted for projecting upon a screen from a film, a series of pictures recorded in accordance with the process of this application, this projector being of the same continuously open lens type.

What we claim is:—

1. The method of taking continuous pictures which consists in moving a film having a series of sensitized surfaces attached by one edge of said film and arranged in parallel planes through a reflected field of illumination of a continuously open fixed lens system and maintaining the image of said lens system in focus in the planes of the exposed portions of said sensitized surfaces and the field of illumination stationary with respect to said sensitized surfaces during the passage of said sensitized surfaces through said field of illumination of said lens system.

2. The method of taking continuous pictures which consists in moving a film having a series of photographically sensitized surfaces attached by one edge to said film and continuously moving a series of reflectors continuously through the field of a continuously open fixed lens system and in paths arranged at angles to each other and to the principal axis of said lens system, the path of said reflectors being through the principal axis of said lens system and the path of said photographic surfaces being such as to maintain the image in focus on the exposed portion of said sensitized surface and the field stationary with respect to said sensitized surface during the passage of said sensitized surface through the reflected field of illumination of said lens.

3. The method of taking continuous pictures which consists in continuously moving a film having a series of photographically sensitized surfaces attached by one edge of said film and arranged in parallel planes, and synchronously moving a series of reflectors continuously through the principal axis of the lens to reflect the light from said lens to said photographic surfaces consecutively and successively and to maintain the exposed portions of said film at fixed focal distances from the optical center of said lens during the passage of said sensitized surfaces through the field of illumination of said lens system as reflected by said reflectors.

4. The method of taking continuous pictures which consists in moving a film having a series of sensitized surfaces attached at one edge to said film and arranged in parallel planes through a reflected field of illumination of a continuously open fixed lens system, and maintaining the image of said lens system in focus in the planes of the respective exposed portions of said sensitized surfaces and the field of illumination stationary with respect to said sensitized surfaces during the passage of said sensitized surfaces through the field of illumination of said lens system and interposing between adjacent sensitized surfaces complementary color screens during the practice of the steps of the method.

MYRON F. HILL.
LEWIS D. HILL

Witnesses:
SIMON YOHALEM,
H. P. BEHRMAN.